United States Patent
Okada et al.

(10) Patent No.: US 9,842,663 B2
(45) Date of Patent: Dec. 12, 2017

(54) CORE MONITORING SYSTEM

(75) Inventors: Masayuki Okada, Saitama (JP); Atsuhiko Koizumi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 13/978,835

(22) PCT Filed: Dec. 21, 2011

(86) PCT No.: PCT/JP2011/007166
§ 371 (c)(1),
(2), (4) Date: Jul. 9, 2013

(87) PCT Pub. No.: WO2012/095932
PCT Pub. Date: Jul. 19, 2012

(65) Prior Publication Data
US 2013/0287159 A1    Oct. 31, 2013

(30) Foreign Application Priority Data
Jan. 12, 2011  (JP) .................... 2011-004101

(51) Int. Cl.
*G21C 17/108* (2006.01)
*G21C 17/00* (2006.01)
*G21D 3/00* (2006.01)

(52) U.S. Cl.
CPC .......... *G21C 17/108* (2013.01); *G21C 17/00* (2013.01); *G21D 3/001* (2013.01); *Y02E 30/40* (2013.01)

(58) Field of Classification Search
CPC ....... G21C 17/108; G21C 17/00; G21D 3/001
(Continued)

(56) References Cited

U.S. PATENT DOCUMENTS 5,174,946 A * 12/1992 Watford ............... G21C 17/108
376/216
2011/0286566 A1* 11/2011 Umemura ............ G21C 17/108
376/254

FOREIGN PATENT DOCUMENTS

JP        61-91597       5/1986
JP       63 290994      12/1988
(Continued)

OTHER PUBLICATIONS

International Search Report dated Feb. 7, 2012 in PCT/JP11/07166 Filed Dec. 21, 2011.
(Continued)

*Primary Examiner* — Jack W Keith
*Assistant Examiner* — Lily C Garner
(74) *Attorney, Agent, or Firm* — Oblon McClelland, Maier & Neustadt, L.L.P.

(57) ABSTRACT

A core monitoring system including: a TIP measuring a neutron amount in a nuclear reactor; a TIP drive device; a TIP panel; a neutron monitoring panel; and a process computer. The TIP panel includes: a TIP level processor and a TIP position processor that process a TIP level signal and a TIP position signal input from the TIP drive device, respectively; a time setting section synchronizing the TIP level signal and the TIP position signal; and a TIP level data storage section storing synchronized TIP level data. The neutron monitoring panel includes a time setting section setting collecting time of a LPRM level signal and an APRM level signal. The process computer compares the time and stores the TIP level data from the TIP panel and the LPRM and APRM level signals from the neutron monitoring panel corresponding in time, and calculates core performance based on the TIP level data.

4 Claims, 7 Drawing Sheets

(58) Field of Classification Search
USPC .......................................................... 376/254
See application file for complete search history.

(56) References Cited

FOREIGN PATENT DOCUMENTS

| JP | 1 260399 | 10/1989 |
|---|---|---|
| JP | 3 9298 | 1/1991 |
| JP | 6 300888 | 10/1994 |
| JP | 8 136688 | 5/1996 |
| JP | 10 111379 | 4/1998 |
| JP | 2001 99979 | 4/2001 |
| JP | 2001-99979 | 4/2001 |
| JP | 2004 226182 | 8/2004 |
| JP | 2005 24383 | 1/2005 |
| JP | 2010-164338 | 7/2010 |

OTHER PUBLICATIONS

Finnish Office Action dated Oct. 17, 2014, in Finnish Patent Application No. 20135820.

\* cited by examiner

CORE MONITORING SYSTEM

TECHNICAL FIELD

The present invention relates to a core monitoring system for a nuclear plant.

BACKGROUND ART

In a conventional core monitoring system for a nuclear plant, a TIP (Traversing Incore Probe) device is used about once every month to measure an amount of neutron while moving a detector inside a reactor in an axial direction thereof. And data of a reactor power distribution at each height position in a core axial direction are transmitted to a process computer. The process computer uses the data to maintain accuracy of the power distribution calculation performed every stipulated time period.

A conventional core monitoring system is illustrated in FIG. 7 (Patent Documents 1 and 2). In FIG. 7, a TIP device drives a TIP detector 1-4 in TIP guide tubes 1-3 installed inside a core 1-2 of a reactor 1-1 to generate a TIP position signal corresponding to a travel distance when pulling the TIP detector 1-4 from the core top toward the core bottom, and reads a TIP level signal in synchronization with the TIP position signal to thereby measure neutron distribution along axial direction of the core.

The TIP detector 1-4 is driven based on a drive signal (detector insertion/pull-out signal) that a process computer A and a TIP panel C output, while cooperating with each other, to a TIP drive device D.

Along with loading of TIP position signal 5 and TIP level signal 6, the process computer A reads an LPRM (Local Power Range Monitoring) level signal and an APRM (Average Power Range Monitor) level signal from a neutron monitoring panel B at a predetermined timing to increase accuracy of a power distribution calculation performed in a core performance calculation or LPRM/APRM gain calibration.

Further, the process computer A inputs thereto from the TIP device the TIP position signal 5 indicating a height position of the TIP detector and the TIP level signal 6 corresponding to the height position, and a time [ms] when the above signals are obtained and inputs thereto from the neutron monitoring panel B the LPRM level signal and the APRM level signal 7, plant data (feed water flow rate, pressure, temperature, etc.) and control rod position data required for heat balance calculation or power distribution calculation which are to be calculated in the core performance calculation.

PRIOR ART DOCUMENTS

Patent Documents

Patent Document 1: Japanese Patent Application Laid-Open Publication No. 2005-24383
Patent Document 2: Japanese Patent Application Laid-Open Publication No. 10-111379

SUMMARY OF THE INVENTION

Problems to be Solved by the Invention

Problems of the above conventional core monitoring system will be described below.

First, in the conventional monitoring system, the data other than the TIP level signal are data obtained at a timing of data collection periodically performed by the process computer A, so that an error due to time lag exists between each of the collected datum.

That is, in the conventional core monitoring system, the TIP level signal 6 and time data indicating a time at which the level signal is read are transmitted from the TIP panel C, whereas the LPRM/APRM level signals 7 from the neutron monitoring panel B are not attached with the time data. Thus, the process computer A periodically monitors the input of the TIP position signal 5. And the process computer A loads, based on the input TIP position signal 5, the APRM level signal measured at the core top, the core center, and the core bottom and LPRM level signal 7 measured at the LPRM height. Therefore, due to signal transmission delay between the TIP panel C and process computer A or input detection delay of the TIP position signal 5 in the process computer A, a time lag occurs between the TIP level signal 6 and the LPRM/APRM level signals 7 to be acquired at the same timing as the TIP position signal 5, resulting in occurrence of an error in the power distribution calculation.

Secondly, in the power distribution calculation to be performed in the core performance calculation, the latest data are used to calculate the heat balance of, e.g., thermal output or the plant data, so that in the power distribution calculation of TIP learning using TIP data at a time of execution of TIP or LPRM learning after LPRM calibration, a time lag occurs between the TIP data and the plant data, resulting in occurrence of an error in the power distribution calculation.

Thirdly, in a case where an instantaneous value is used without change as the LPRM level signal and the APRM level signal 7 to be input from the neutron monitoring panel B, an error is superposed on the LPRM/APRM level signals 7 during execution of the TIP due to fluctuation of the plant, leading to accuracy degradation of the power distribution calculation. The neutron monitoring panel B uses the LPRM/APRM level signals 7 in a plant interlock such as scram, so that the averaging processing cannot be applied.

Fourthly, the control rod position data used in the power distribution calculation is not attached with the time data, so that the TIP data, the LPRM/APRM level signals, the plant data (heat balance to be calculated from the plant data), and the control rod position data are not time-consistent with each other. It follows that when a control rod is operated at an exertion time of the power distribution calculation, control rod data before the operation may be used, depending on the timing, in the power distribution calculation, which may degrade accuracy of the calculation. Therefore, the control rod cannot be operated from several minutes before activation of the punctual power distribution calculation until completion thereof, and an operator needs to confirm not only an operation state of the control rod but also the time.

Fifthly, in the conventional core monitoring system, all the data (TIP data, the LPRM/APRM level signals, the plant data (heat balance to be calculated from the plant data), the control rod position data) required in the core performance calculation are not time-consistent with each other, so that the power distribution calculation using past data cannot be performed, and an analysis has been made based on predictive calculation using certain reasonable values.

The present invention has been made to solve the above problems, and an object thereof is to provide a core monitoring system capable of performing accurate power distribution calculation by preventing an error due to a time lag from occurring between the data to be used in the calculation.

Means for Solving the Problem

According to an embodiment, there is provided a core monitoring system comprising: a TIP (Traversing Incore Probe) that measures an amount of neutrons in a reactor core; a TIP drive device; a TIP panel; a neutron monitoring panel; and a process computer, the TIP panel including a TIP level processing section that processes a TIP level signal input from the TIP drive device, a TIP position processing section that processes a TIP position signal input from the TIP drive device, a TIP panel time setting section that sets a TIP panel time for synchronizing the TIP level signal and TIP position signal, and a TIP level data storage section that stores synchronized TIP level data, the neutron monitoring panel including a neutron monitoring panel time setting section that sets a neutron monitoring panel time corresponding to a collection time of a LPRM (local power range monitoring) level signal and an APRM (average power range monitor) level signal, the process computer including a TIP level data database that compares a TIP time attached to the TIP level data transmitted from the TIP panel and a nuclear implementation console time attached to the LPRM level signal and the APRM level signal transmitted from the nuclear implementation console and stores the TIP level data and the LPRM level signal and the APRM level signal corresponding in time to each other and a core performance calculating section that calculates core performance based on the data stored in the TIP level data database.

Advantage of the Invention

According to the present invention, the core power distribution calculation can be performed with high accuracy by preventing an error due to a time lag from occurring between the data to be used in the calculation.

EMBODIMENTS FOR CARRYING OUT THE INVENTION

Embodiments of a core monitoring system according to the present invention will be described below with reference to the accompanying drawings.

First Embodiment

Figure 1:
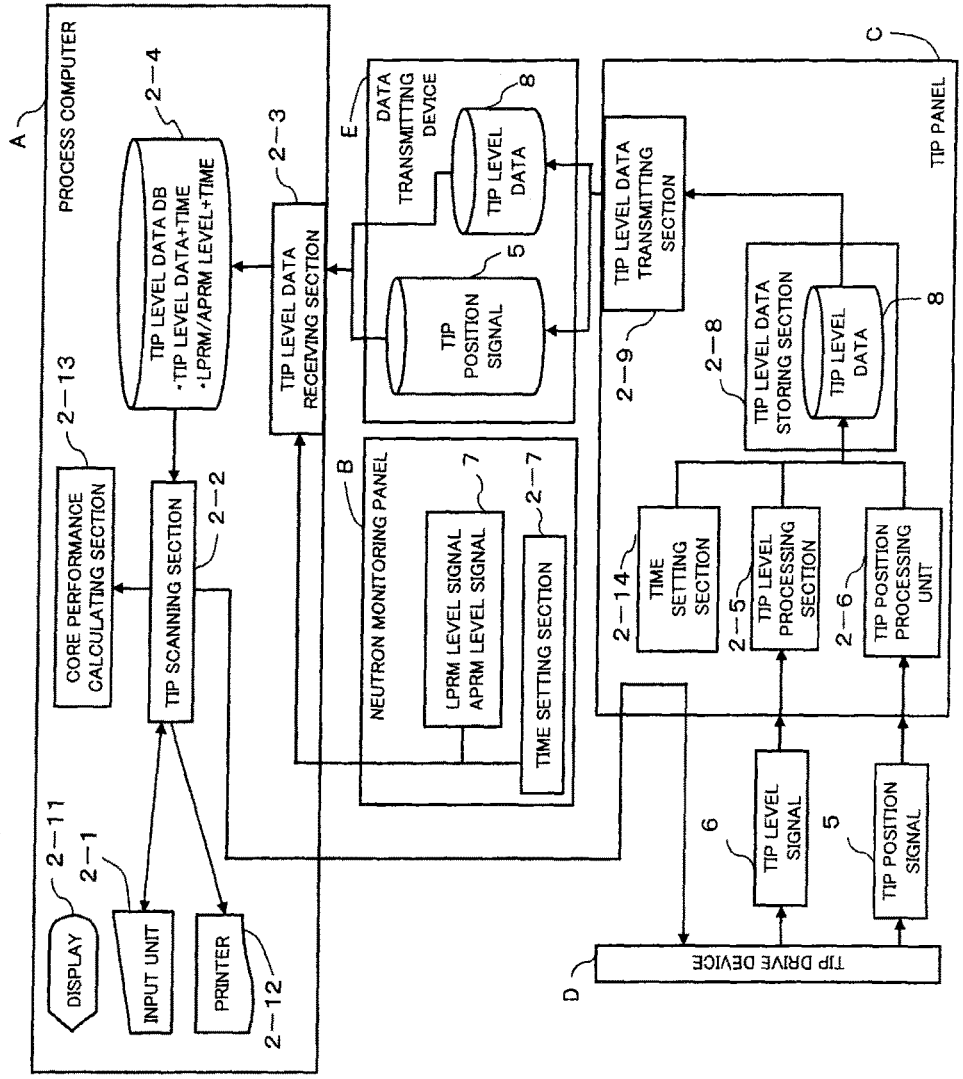
FIG. 1 is a configuration view of a core monitoring system according to a first embodiment.

A core monitoring system according to a first embodiment will be described with reference to FIGS. 1 and 2.

(Configuration)

The core monitoring system according to the first embodiment includes a process computer A, a neutron monitoring panel B, a TIP panel C, a TIP drive device D, and a data transmitting device E.

The process computer A includes: an input unit 2-1 thereof that an operator operates in an interactive manner; a TIP scanning section 2-2 that performs TIP scan according to a TIP scan request from the operator; a TIP level data receiving section 2-3 that receives a signal from the neutron monitoring panel B, and TIP level data stored in the TIP panel C and a current TIP position signal through the data transmitting device E, and synchronizes the received signals; a TIP level data DB 2-4 that stores the TIP level data; and a core performance calculating section 2-13.

The neutron monitoring panel B includes a time setting section 2-7 that sets a time in the LPRM level signal and the APRM level signal 7 so as to synchronize the signals in the process computer A and transmits the LPRM level signal and the APRM level signal 7 and the time data set in the time setting section 2-7 to the process computer A.

The TIP panel C includes a TIP level processing section 2-5 that inputs the TIP level signal 6 from the TIP drive device D; a TIP position processing section 2-6 that inputs the TIP position signal 5 from the TIP drive device D; a TIP level data storing section 2-8 that inputs the TIP level signal 6 in synchronization with the TIP position signal 5 and stores TIP level data 8; a TIP level data transmitting section 2-9 that transmits the TIP level data 8 to the process computer A through the data transmitting device E, and a time setting section 2-14 that sets the time data in the TIP level signal 6 and the TIP position signal 5.

The data transmitting device E passes the TIP level data 8 and the TIP position signal 5 stored in the TIP panel C from the TIP panel C to the process computer A.

(Operation)

Operation of thus configured core monitoring system according to the present embodiment will be described below.

The input unit 2-1 is provided in the process computer A, and the operator uses this device to request execution of the TIP. The request from the operator is processed in the TIP scanning section 2-2 of the process computer A to activate the TIP drive device D through the TIP panel C, thereby driving a TIP detector.

An amount of neutrons measured by the TIP detector is input to the TIP level data storing section 2-8 as the TIP level signal 6 through the TIP level processing section 2-5 of the TIP panel C.

A height position of the TIP detector moved from the core top to the core bottom is input, as the TIP position signal 5 generated when the TIP detector is inserted from the core bottom into the core top and when the TIP detector is pulled from the core top to the core bottom, to the TIP level data storing section 2-8 through the TIP position processing section 2-6 of the TIP panel 6. Further, in order to synchronize the TIP level signal 6 and the TIP position signal 5, times at which the respective signals are collected are set in the time setting section 2-14 and input to the TIP level data storing section 2-8.

The TIP level data storing section 2-8 of the TIP panel C synchronizes the TIP position signal 5 and the TIP level signal 6 based on the times set in the time setting section 2-14 and stores therein the synchronized data as the TIP level data 8. The TIP level data 8 stored in the TIP level data storing section 2-8 is passed from the TIP level data transmitting section 2-9 to the TIP level data receiving section 2-3 of the process computer A through the data transmitting device E at a scan completion time of each string.

The TIP position signal 5 stored in the TIP level data storing section 2-8 is constantly passed from the TIP level data transmitting section 2-9 to the TIP level data receiving section 2-3 of the process computer A through the data transmitting device E.

The time setting section 2-7 of the neutron monitoring panel B sets times at which the LPRM level signal and the APRM level signal are collected for synchronization to be achieved in the process computer A. Further, the LPRM level signal, the APRM level signal, and the time data of these signals set in the time setting section 2-7 are constantly transmitted to the TIP level data receiving section 2-3 of the process computer A.

As described above, the TIP level data receiving section 2-3 of the process computer A reads the LPRM level signal, the APRM level signal 7 and the time data of the respective signals from the neutron monitoring panel in addition to the TIP level data 8 input from the transmitting device E.

Further, the TIP level data receiving section 2-3 determines whether the TIP detector is situated at the core bottom, the core center, or the core top based on the current TIP position signal and retrieves the time data corresponding to each point. The TIP level data receiving section 2-3 compares the retrieved the time data with the time data of the LPRM/APRM level signals 7 transmitted from the neutron monitoring panel B and stores the LPRM level signal and the APRM level signal 7a corresponding to the retrieved time data in the TIP level data DB 2-4.

The above determination processing is repeatedly performed at a high speed, and the LPRM level and the APRM level stored in the TIP level data DB 2-4 are stored for all channels for each TIP detector (machine).

Figure 2:
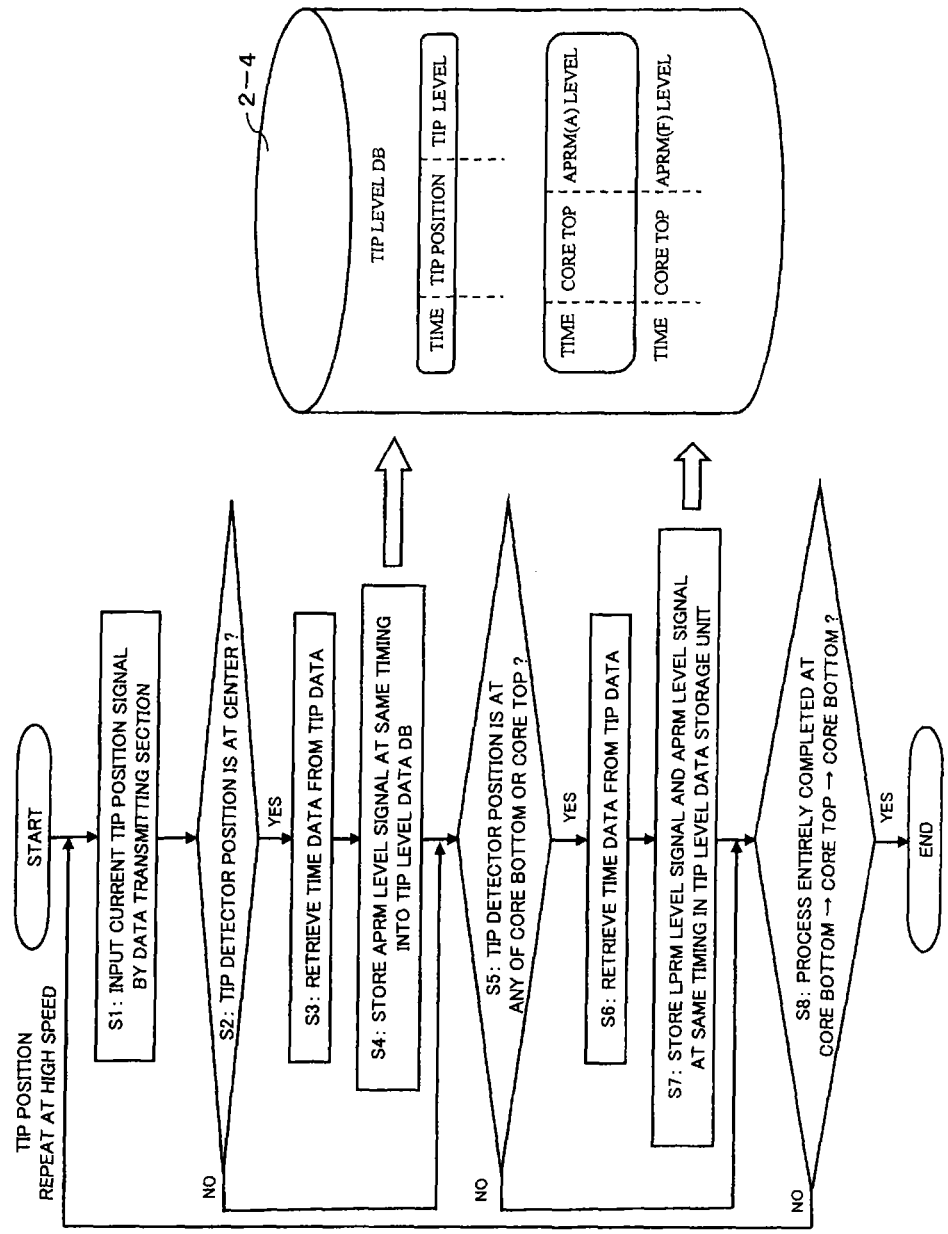
FIG. 2 is a view illustrating a process flow of a TIP level data receiving section according to the first embodiment.

An example of a time synchronization process flow (S1 to S8) between the TIP level data 8 from the TIP panel C, and the LPRM level signal and the APRM level signal 7 from the neutron monitoring panel B, which is performed in the TIP level data receiving section 2-3, is illustrated in FIG. 2.

FIG. 2 illustrates a process flow of a TIP level data receiving section according to the first embodiment.

As illustrated in FIG. 2, a process (S4 and S7) of storing the LPRM/APRM signal corresponding in time to the TIP data measured by the TIP detectors at the various height positions in the TIP level data DB 2-4 is repeatedly performed at a high speed. The measurement data stored in the TIP level data DB 2-4 of the process computer Are displayed on a display 2-11 by the TIP scanning section 2-2, printed as a log by a printer 2-12, and passed to the core performance calculating section 2-13 for the power distribution calculation.

(Effects)

As described above, the TIP level signal 6, the TIP position signal 5, and the time data are collected while they are synchronized with each other in the TIP level data storing section 2-8 of the TIP panel C, the TIP position signal 5 and the TIP level data 8 are constantly transmitted from the TIP panel C to the process computer A, and the LPRM level signal, the APRM level signal, and the time data are constantly transmitted from the neutron monitoring panel B to the process computer A. This allows achievement of the time synchronization based on the time data in the process computer A, which in turn allows accurate measurement free from signal transmission delay or signal detection delay. As a result, the LPRM level signal and the APRM level signal essential for the power distribution calculation can be obtained with an accuracy equivalent to or better than ever before.

As described above, according to this first embodiment, the LPRM level signal and the APRM level signal are transmitted to the process computer with a function of adding the time data to the LPRM level signal and the APRM level signal provided, and the process computer retrieves, based on the TIP level signal and the time data, the LPRM/APRM data corresponding in time to the TIP level signal. This allows the power distribution calculation to be free from signal transmission delay or signal detection delay, thereby increasing accuracy of the power distribution calculation.

Second Embodiment

Figure 3:
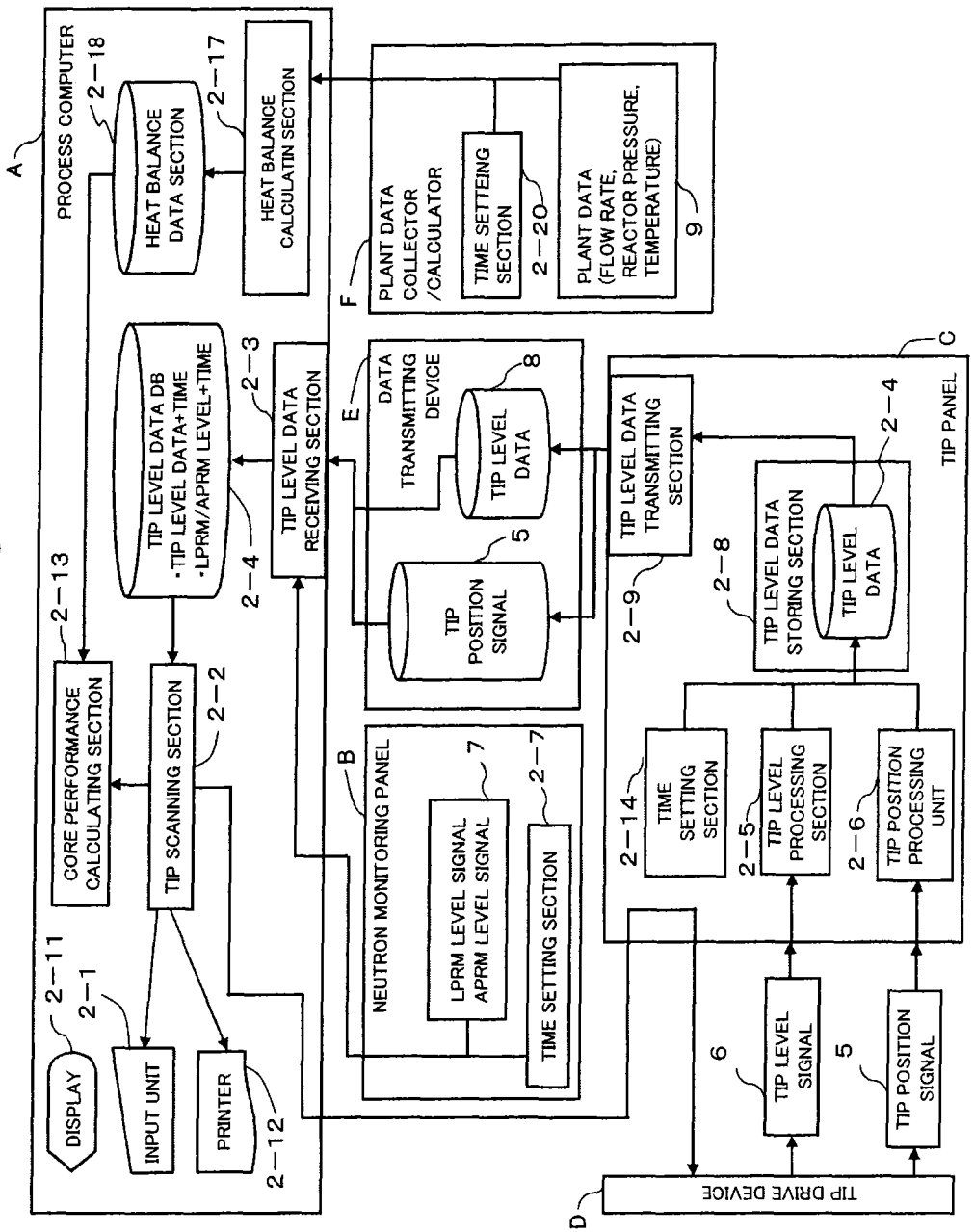
FIG. 3 is a configuration view of a core monitoring system according to a second embodiment.

A core monitoring system according to a second embodiment will be described with reference to FIGS. 3 and 4.

The same reference numerals are given to the same components as those in the first embodiment, and the repeated description will be omitted.

(Configuration)

A core monitoring system according to a second embodiment includes, in addition to the components of the core monitoring system of the first embodiment, a plant data collector/calculator F that transmits the plant data 9 such as flow rate, reactor pressure, and temperature to the process computer A together with time at which the plant data 9 is collected which is set using a time setting section 2-20, a heat balance calculating section 2-17 that performs heat balance calculation, and a heat balance data section 2-18 that stores a result of the heat balance calculation and passes the result to the core performance calculating section 2-13. The heat balance calculating section 2-17 and the heat balance data section 2-18 are provided in the process computer A.

(Operation)

Operation of thus configured core monitoring system will be described below.

The input unit 2-1 is provided in the process computer A, and the operator uses this device to request execution of the TIP. The request from the operator is processed in the TIP scanning section 2-2 of the process computer A to activate the TIP drive device D through the TIP panel C, thereby driving the TIP detector.

The plant data collector/calculator F collects the plant data 9 such as flow rate, reactor pressure, and temperature and constantly transmits the collected the plant data 9 to the heat balance calculating section 2-17 together with the time at which the plant data 9 is collected.

The heat balance calculating section 2-17 periodically calculates heat balance based on the plant data 9 transmitted from the plant data collector/calculator F. The plant data 9 and a result of the heat balance calculation are transmitted from the heat balance data section 2-18 to the core performance calculating section 2-13.

A set of the plant data 9, the result of the heat balance calculated based on the plant data 9, and the time at which the plant data 9 are collected are referred to as "heat balance data".

For the TIP data, TIP data synchronized based on the time data are stored in the TIP level data DB 2-4. The stored TIP data is transmitted to the core performance calculating section 2-13 through the TIP scanning section 2-2.

The core performance calculating section 2-13 searches for the time-corresponding data based on the time data of the transmitted the heat balance data and the time data retained in the TIP level data DB 2-4, makes TIP detectors scan in the same guide tube (string) to make outputs of the TIP detectors coincide with each other, and calculates machine normalization factors, thereby performing the power distribution calculation.

In the calculation of the machine normalization factors, an average value of the APRM signals 6 at the core top, the core center, and the core bottom is used based on an APRM calibration factor calculated from the time-corresponding the heat balance data and the time-corresponding TIP level data DB 2-4. This advantageously eliminates the use of data collected at different times, so that an error due to a time lag is not included in the calculation.

Figure 4:
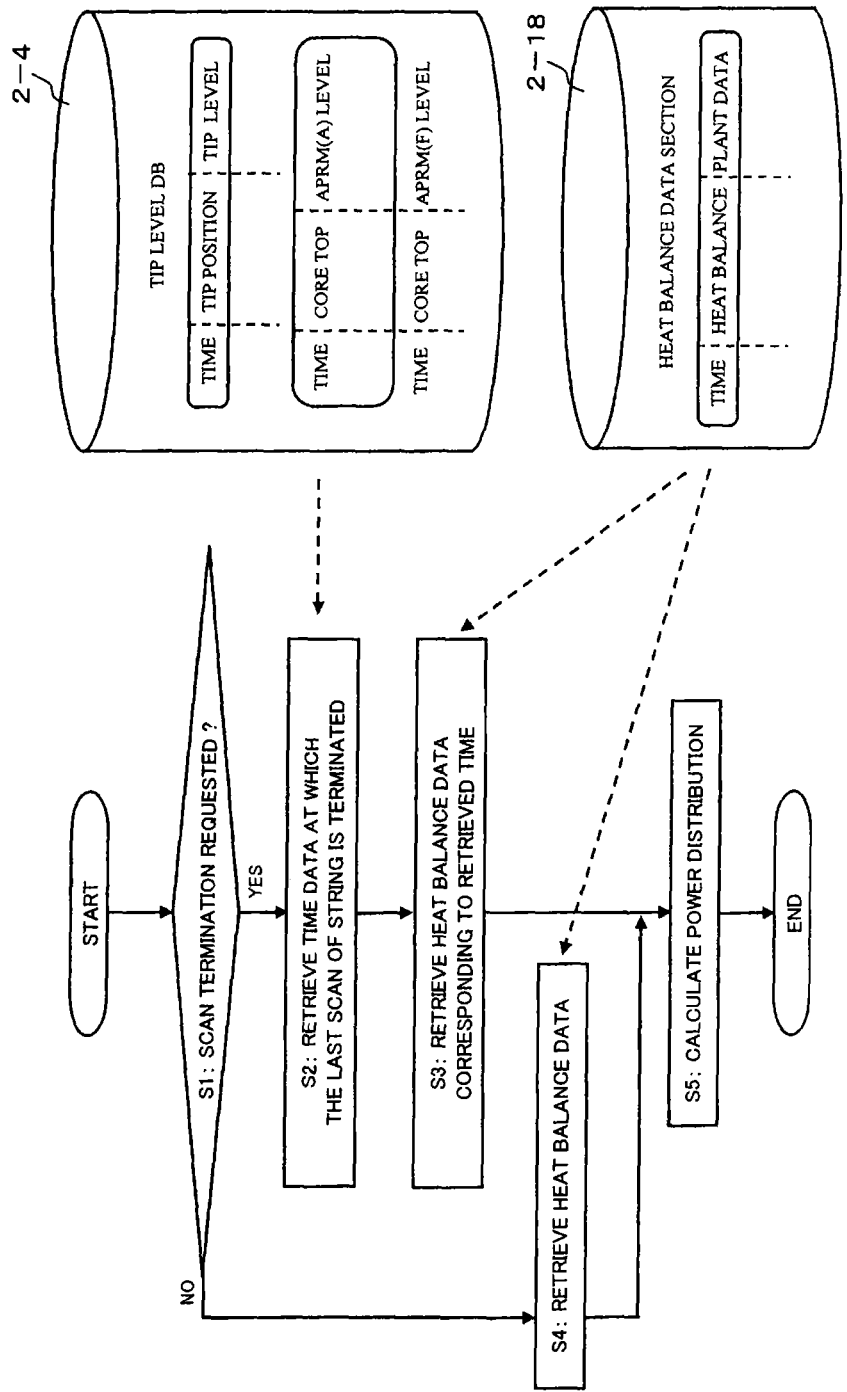
FIG. 4 is a view illustrating a process flow of a core performance calculating section according to the second embodiment.

A flow of time synchronization process (Steps S1 to S5) in the core performance calculating section 2-13 is illustrated in FIG. 4.

As illustrated in FIG. 4, after the TIP scan has been completed, the core performance calculating section 2-13 determines whether the operator has issued a scan termination request. When there has been issued the scan termination request from the operator (Step S1), the core performance calculating section 2-13 retrieves the time data at which the last scan of the string is terminated from the TIP level data DB 2-4 (Step S2), retrieves the heat balance data corresponding to the retrieved the time data from the heat balance data section 2-18 (Step S3), and performs the power distribution calculation (Step S5). This allows data immediately after completion of the TIP to be used in the power distribution calculation, thereby preventing occurrence of an error due to fluctuations of the plant data 9 from the termination of the TIP to start of the power distribution calculation.

In the absence of the scan termination request from the operator, the core performance calculating section 2-13 performs punctual or on-demand power distribution calculation, and thus, retrieves the heat balance data at a request time (Step S4) so as to perform the power distribution calculation (Step S5).

(Effects)

As described above, the core performance calculating section 2-13 in the process computer A performs the time synchronization processing between the TIP level data and the heat balance data, thereby performing accurate power distribution calculation in a manner correctly reflecting the power distribution and the plant data 9 at the time of termination of the TIP.

As described above, according to the second embodiment, there are added a function that adds the time data to the plant data and a function that searches the TIP data at the time of execution of the TIP, the plant data and the heat balance data used in the TIP learning and LPRM learning by using time as a search key to retrieve the time-corresponding data in the core performance calculation. This allows achievement of the time synchronization among the data to be used in the power distribution calculation, thereby increasing accuracy of the power distribution calculation.

Third Embodiment

Figure 5:
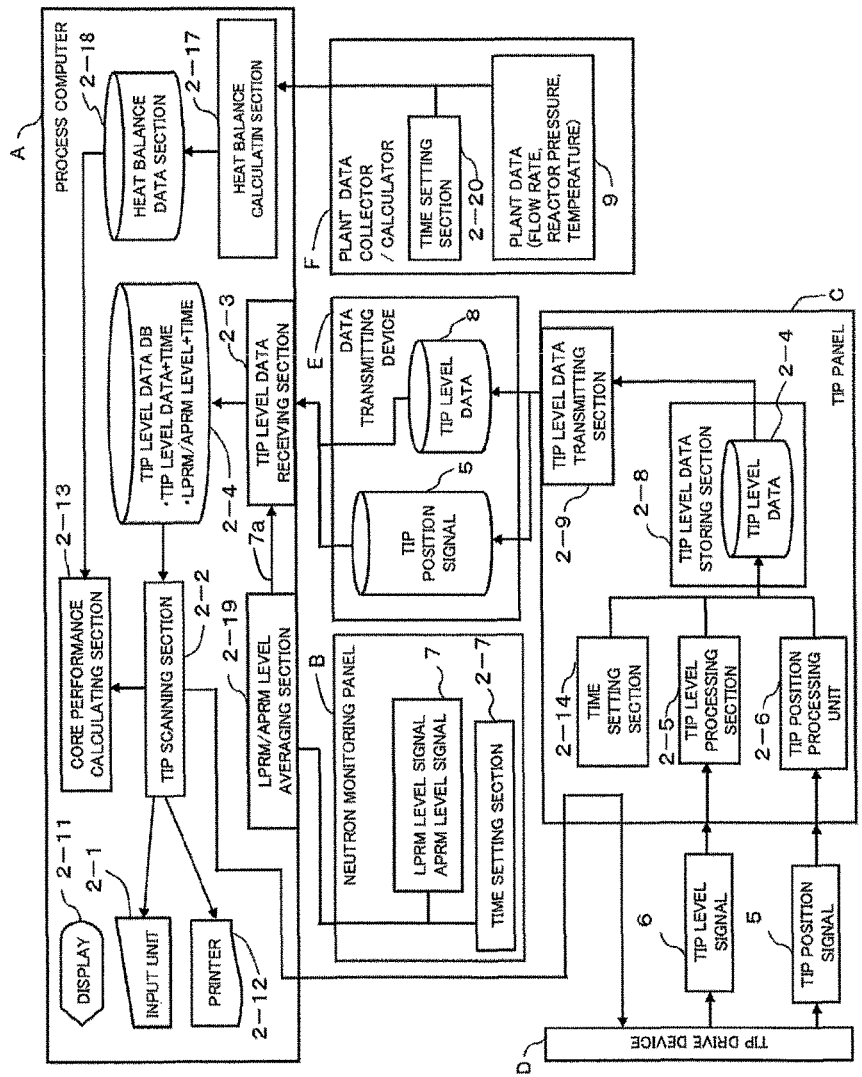
FIG. 5 is a configuration view of a core monitoring system according to a third embodiment.

A core monitoring system according to a third embodiment will be described with reference to FIG. 5.

The same reference numerals are given to the same components as those in the first and second embodiments, and the repeated description will be omitted.

(Configuration)

A core monitoring system according to a third embodiment additionally includes, in the process computer A of the second embodiment, an LPRM/APRM level averaging section 2-19 that suppresses fluctuations of the LPRM/APRM levels due to fluctuation of the plant.

(Operation)

Operation of thus configured core monitoring system will be described below.

The LPRM/APRM level averaging section 2-19 can set a filtering constant for suppressing the fluctuation and a sampling period for the LPRM level signal and the APRM level signal 7 from the neutron monitoring panel B, performs averaging according to the filtering constant and the sampling period that have been set, and transmits the resultant signals to the TIP level data receiving section 2-3.

In addition to the above-mentioned averaging, averaging at an arbitrary period and with an arbitrary number of collected data, such as one-minute averaging (using 12 points with intervals of 5 seconds therebetween) or 15 second averaging (using 3 points with intervals of 5 seconds therebetween) can be adopted.

The TIP level data receiving section 2-3 determines, based on the current TIP position signal, whether the TIP detectors have been moved to be situated at the core bottom, the core center, and the core top, respectively, and retrieves the time data at respective points. Then, the TIP level data receiving section 2-3 compares the retrieved the time data and the time data of the averaged LPRM level signal and APRM level signal 7a transmitted from the LPRM/APRM level averaging section 2-19 and stores the averaged LPRM level signal and APRM level signal 7 corresponding to the retrieved the time data in the TIP level data DB 2-4.

The core performance calculating section 2-13 reads the averaged LPRM level signal and APRM level signal 7a and a heat balance calculation result from the TIP level data DB 2-4 and the heat balance data 2-18, respectively and performs the power distribution calculation, thereby preventing an error due to fluctuation of the plant.

(Effects)

As described above, the process computer A has a function of averaging the LPRM/APRM levels and thus it is possible to suppress fluctuations of the value of the LPRM/APRM levels due to fluctuation of plant without influencing a function that uses the LPRM/APRM level signals in a plant interlock such as scram, thereby performing the power distribution calculation with high accuracy.

As described above, according to the third embodiment, adding the averaging function to the process computer so as to suppress fluctuation can eliminate an error due to the fluctuation without exerting influence on the plant interlock such as a scram that uses the LPRM/APRM level signals, thereby performing the power distribution calculation with high accuracy.

Fourth Embodiment

Figure 6:
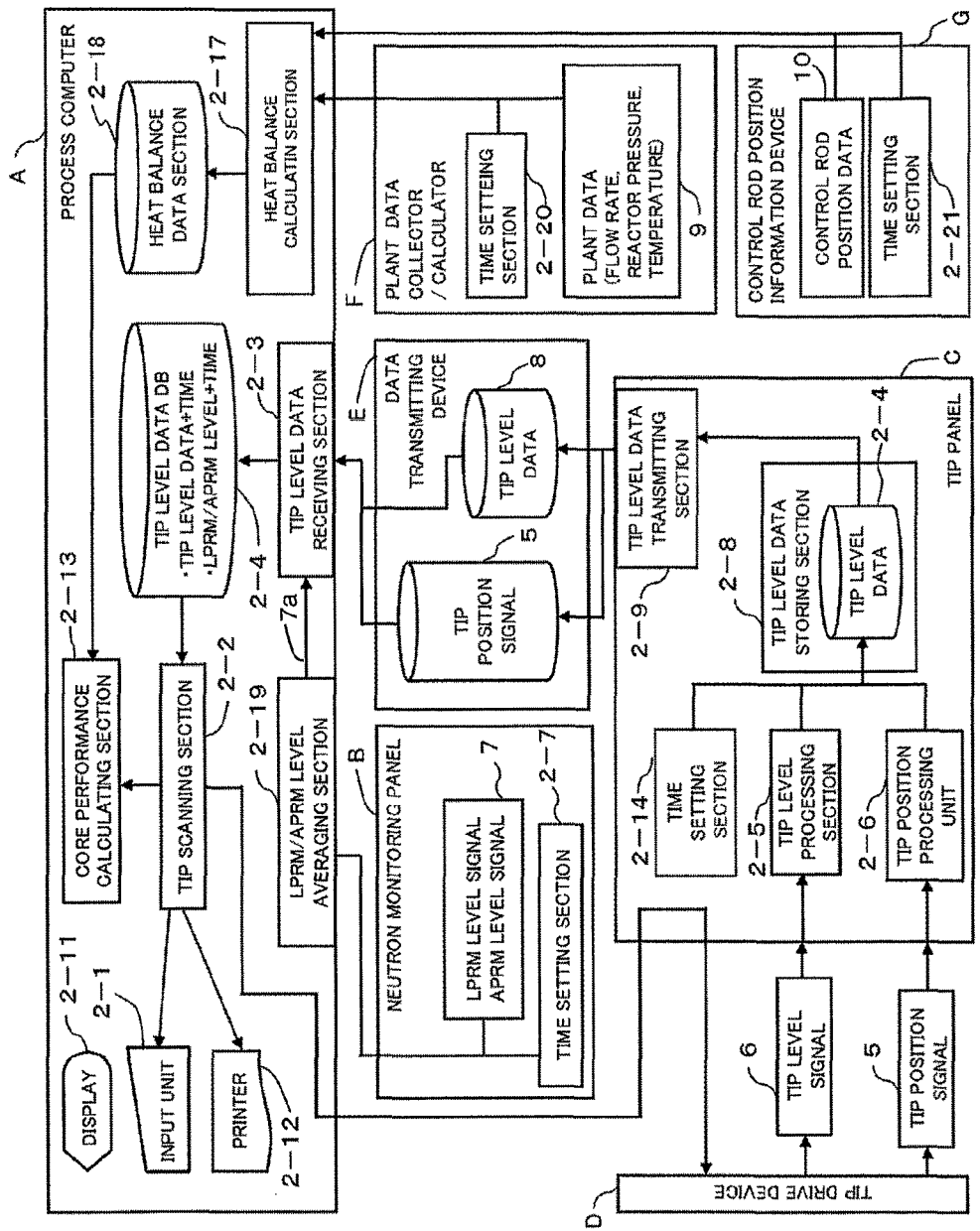
FIG. 6 is a configuration view of a core monitoring system according to a fourth embodiment.
Figure 7:
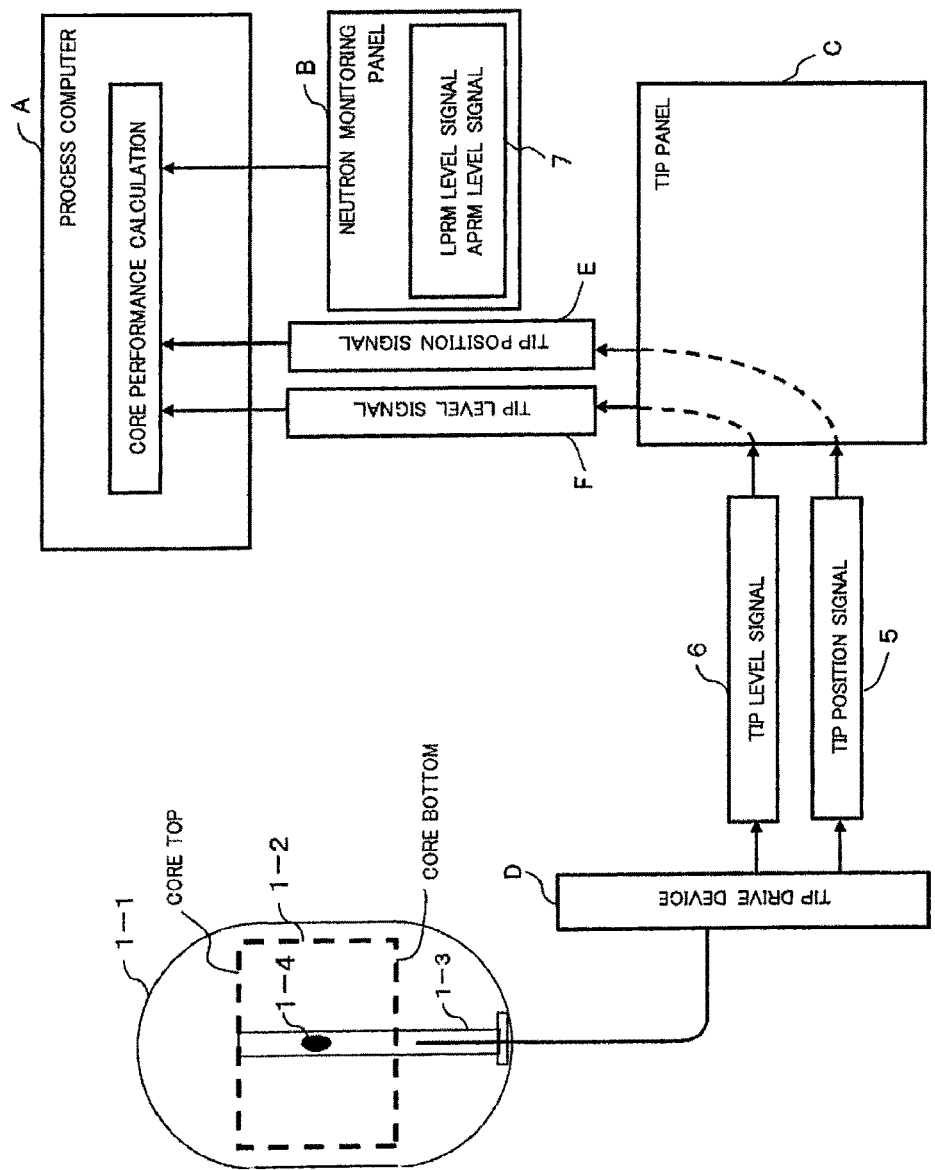
FIG. 7 is a configuration view of a conventional core monitoring system.

A core monitoring system according to a fourth embodiment will be described with reference to FIG. 6.

The same reference numerals are given to the same components as those in the first to third embodiments, and the repeated description will be omitted.

(Configuration)

A core monitoring system according to the fourth embodiment additionally includes, in the configuration of the third embodiment, a control rod position information device G provided with the control rod position data 10 and a time setting section 2-21 so as to set the time data also for the control rod position data 10.

(Operation)

Operation of the thus configured core monitoring system will be described below.

The plant data collector/calculator F collects the plant data (flow rate, reactor pressure, and temperature) 9, sets time at which the plant data have been collected, and constantly transmits the resultant collected the plant data to the heat balance calculating section 2-17. The control rod position information device G collects the control rod position data 10, sets time at which the control rod position data 10 has been collected, and constantly transmits the resultant data to the heat balance calculating section 2-17.

Based on the received the plant data and the control rod data, the heat balance calculating section 2-17 performs the heat balance calculation using the data corresponding to periodical calculation timing and stores a result of the calculation in the heat balance data section 2-18.

The core performance calculating section 2-13 searches the heat balance data section 2-18 for data at the execution time of the periodical power distribution calculation and performs calculation of the retrieved data.

In the power distribution calculation after execution of the TIP, the core performance calculating section 2-13 searches for the time-corresponding data based on the time data of the heat balance data and the time data retained in the TIP level data DB 2-4 and performs the power distribution calculation using the time-corresponding data.

This allows achievement of the time synchronization among all the data to be used in the power distribution calculation, thereby increasing accuracy of the core performance calculation.

(Effects)

As described above, in addition to synchronization of the TIP level data and the heat balance data, synchronization of the control rod data can be achieved by the time setting section of the control rod position information device G, thereby performing accurate power distribution calculation in a manner correctly reflecting the power distribution and the plant data at the time of termination of the TIP.

As described above, according to the fourth embodiment, there is provided a function of adding the time data to the control rod data, and the control rod data added with the time data is transferred to the process computer and whereby time consistency among all the data (TIP data, the LPRM/APRM level signals, the plant data, the heat balance data calculated from the plant data, the control rod position data) required for the core performance calculation can be achieved in the process computer, thereby increasing accuracy of the power distribution calculation.

While certain embodiments have been described, these embodiments have been presented by way of example only, and are not intended to limit the scope of inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

EXPLANATION OF REFERENCE SYMBOLS

A process computer
B neutron monitoring panel
C TIP panel
D TIP drive device
E data transmitting device
F plant data collector/calculator
G control rod position information device
1-1 reactor
1-2 core
1-3 TIP guide tubes
1-4 TIP detector
2-1 input unit
2-2 TIP scanning section
2-3 TIP level data receiving section
2-4 TIP level data DB
2-5 TIP level processing section
2-6 TIP position processing section
2-7 time setting section
2-8 TIP level data storing section
2-9 TIP level data transmitting section
2-11 display
2-12 printer
2-13 core performance calculating section
2-14 time setting section
2-17 heat balance calculating section
2-18 heat balance data section
2-19 LPRM/APRM level averaging section
2-20 time setting section
2-21 time setting section
5 TIP position signal
6 TIP level signal
7 LPRM/APRM level signal
8 TIP level data
9 plant data
10 control rod position data

What is claimed is:

1. A core monitoring system comprising:
a TIP (Traversing Incore Probe) that measures an amount of neutrons in a reactor core;
a TIP drive device;
a TIP panel;
a neutron monitoring panel; and
a process computer,
the TIP panel including a TIP level processing section that processes a TIP level signal input from the TIP drive device, a TIP position processing section that processes a TIP position signal input from the TIP drive device, a TIP panel time setting section that sets a TIP panel time for synchronizing the TIP level signal and TIP position signal, and a TIP level data storage section that stores synchronized TIP level data,
the neutron monitoring panel including a time setting section that sets a neutron monitoring panel time corresponding to a collection time of a plurality of individual LPRM (local power range monitoring) level signals and an APRM (average power range monitor) level signal which averages at least a plurality of the individual LPRM signals,
the process computer including:
an averaging section that time-averages the plurality of individual LPRM level signals transmitted from the neutron monitoring panel to produce a plurality of time-averaged LPRM level signals and that time-averages the APRM level signal, which APRM level signal varies with time, transmitted from the neutron monitoring panel to produce a time-averaged APRM level signal,
a TIP level data database that compares a TIP time attached to the TIP level data transmitted from the TIP panel and a neutron monitoring panel time attached to the time-averaged LPRM level signals and the time-averaged APRM level signal from the averaging section and stores the TIP level data and the time-averaged LPRM level signals and the time-averaged APRM level signal, with the time-averaged LPRM signals and the time-averaged APRM level signal corresponding in time to each other, and a core performance calculating section that calculates core performance based on the data stored in the TIP level data database.

2. The core monitoring system according to claim 1, further comprising a plant data collector/calculator that transmits the plant data added with collection time to the process computer, wherein the process computer includes a heat balance calculating section that calculates a heat balance based on the data transmitted from the plant data collector/calculator, and the heat balance calculating section transmits a result of the heat balance calculation performed therein to the core performance calculating section.

3. The core monitoring system according to claim 1, further comprising a control rod position information device that has control rod position data added with the collection time, wherein the control rod position information device transmits the control rod position data to the heat balance calculating section.

4. The core monitoring system according to claim 2, further comprising a control rod position information device that has control rod position data added with the collection time, wherein the control rod position information device transmits the control rod position data to the heat balance calculating section.

* * * * *